United States Patent [19]
Peterson et al.

[11] Patent Number: 5,716,044
[45] Date of Patent: Feb. 10, 1998

[54] VEHICLE DOOR AND WIRE HARNESS ARRANGEMENT

[75] Inventors: David Robert Peterson, Aurora, Ohio; Richard Allen White, Franklin, Tenn.; Robert Louis Adduci, Youngstown, Ohio; Timothy James Kline, Fenton; Michael Allen Peters, Westland, both of Mich.

[73] Assignees: General Motors Corporation, Detroit; Saturn Corporation, Troy, both of Mich.

[21] Appl. No.: 579,484

[22] Filed: Dec. 27, 1995

[51] Int. Cl.⁶ ............................................. B60J 3/00
[52] U.S. Cl. .................... 296/152; 49/502; 174/72 A
[58] Field of Search ........................ 174/72 A, 152 G, 174/153 G; 296/39.1, 146.7, 152, 146.9, 208; 49/502

[56] References Cited

U.S. PATENT DOCUMENTS

| | | | |
|---|---|---|---|
| 3,151,905 | 10/1964 | Reuther et al. | 174/72 A |
| 3,366,356 | 1/1968 | Fisher | 174/153 G X |
| 4,289,923 | 9/1981 | Ebert | 174/65 G |
| 5,092,647 | 3/1992 | Ueda et al. | 296/146 |

FOREIGN PATENT DOCUMENTS 0550936  2/1943  United Kingdom ............... 174/153 G

*Primary Examiner*—Hyung S. Sough
*Attorney, Agent, or Firm*—Cary W. Brooks; Ernest E. Helms

[57] ABSTRACT

A vehicle door arrangement is provided including inner and outer panels. The inner panel has a through opening, a tubular grommet which is received in the opening and snap-fittingly secured to the inner panel, and a plurality of electrical conductors extending through the grommet. The through opening in the inner panel extends inwardly from a side edge of the inner panel. The inner panel has at least one ear extending transversely into the opening adjacent the side edge. The grommet is resilient and has a groove which extends inwardly from its outer periphery and whose outwardly facing bottom is shaped substantially complementary to the opening. The ear engages the bottom of the groove and deflects the grommet as the latter is transversely inserted into the opening until the grommet is fully received in the opening and the ear is aligned with a deeper portion of the groove whereupon the grommet, due to its inherent resiliency, returns toward its normal free state position and locks behind the ear to lock the grommet to the panel.

2 Claims, 2 Drawing Sheets

VEHICLE DOOR AND WIRE HARNESS ARRANGEMENT

FIELD OF THE INVENTION

The field of the present invention is that of vehicle doors with electrical wiring and grommets associated therewith.

BACKGROUND OF THE INVENTION

To enhance the environment by improving fuel efficiency, the design of vehicle doors has been modified to reduce vehicle weight while at the same time maximizing interior space capacity. To accomplish the above-noted environmental goal, the space between vehicle door inner and outer structural panel members has been minimized to provide for thinner doors.

Many vehicle doors, especially front vehicle doors, have a multitude of electrical components mounted therein, such as various lights, musical speakers and electrically-powered actuators such as door locks and window regulator mechanisms. The wiring for the above-noted mechanisms is typically bundled together to form a wiring harness which must escape the interior cavity of the door and then enter the vehicle through a door frame pillar to connect with the remainder of the electrical system of the vehicle. When the vehicle door is then opened, the wiring harness is exposed to various elements. To protect the wiring harness from the elements, to protect an occupant from being entangled with the wiring harness and to appropriately protect the wiring harness from damage by contact with the metal portions of the door as it enters the door cavity, there is provided a grommet. The grommet provides a protective passage and typically extends through a circular opening in the inner panel to enter the cavity between the inner and outer panels.

As doors have become thinner and the wiring harnesses have tended to become larger, a problem has arisen in providing enough space for the wire harness to enter the door cavity.

Most prior grommets had an annular section generally corresponding to the diameter of the opening which was juxtaposed by two flanged members. The grommet was clipped or attached to the wiring harness. To seat the grommet in the opening in the door inner panel, the wiring harness was pulled such that one of the flanged members would deform as it was pulled along the axis of the wiring harness until the grommet was seated. Although this procedure worked in a technically satisfactory fashion, it would be ergonomically better if the pulling on the wiring harness to seat the grommet could be eliminated. The pulling on the wiring harness sometimes would cause both of the flanges of the grommet to pass into the hole, thereby causing the grommet to have to be pulled back to be seated properly. Additionally, the pulling on the wiring harness could lead to damage to the wire harness or various connectors connected thereto. Also, as the hole diameter sizes became smaller for the opening and as the wiring harness diameter increased (due to the increased popularity of door electrical components), the above-noted prior method became more difficult.

SUMMARY OF THE INVENTION

To improve the ergonomics of installation and to increase installation reliability, the present invention door arrangement is brought forth. The present door arrangement provides a grommet which may be installed by simple linear motion and which also provides confirmation of proper installation to the vehicle assembler.

DESCRIPTION OF THE PREFERRED EMBODIMENTS

Figure 1:
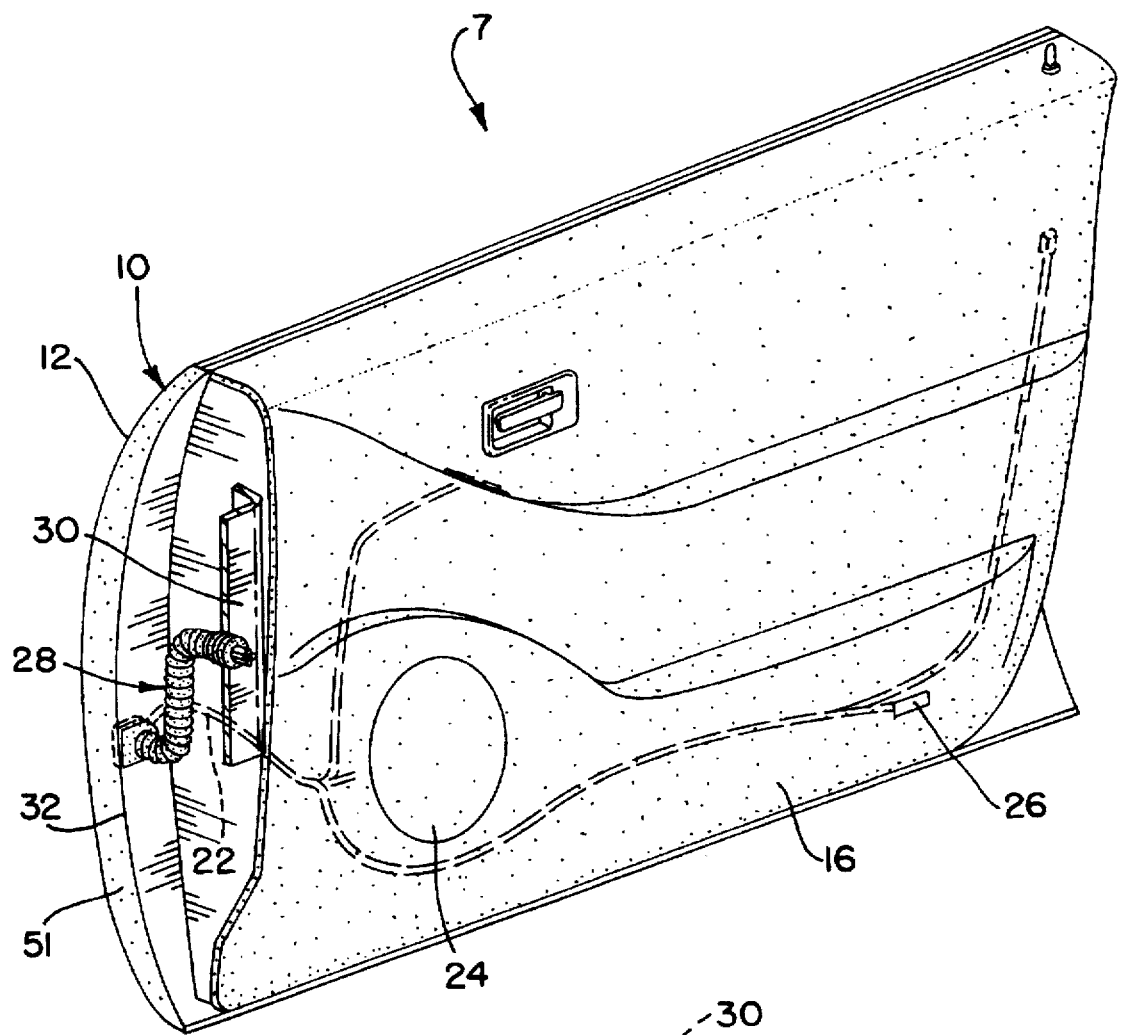
FIG. 1 is a side perspective view of a preferred embodiment of the present invention.
Figure 2:
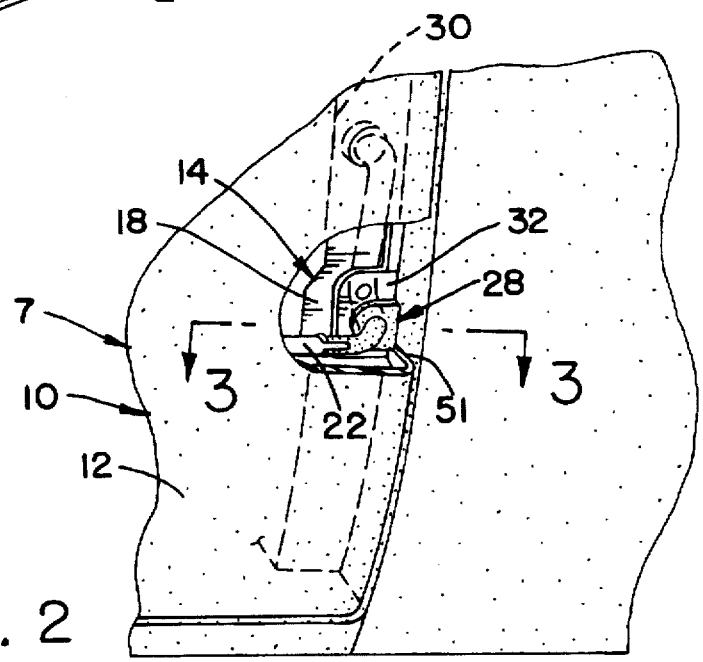
FIG. 2 is a partial perspective view illustrating the invention from the exterior of the vehicle with portions of an outer panel of a vehicle door being remove for clarity of illustration.
Figure 3:
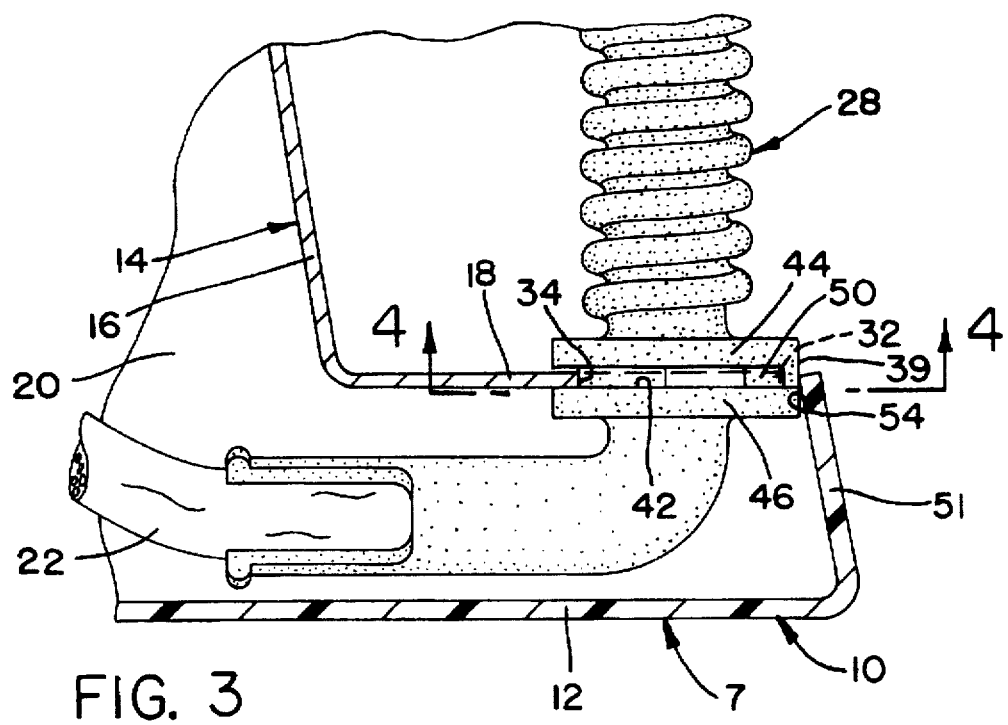
FIG. 3 is a view taken along line 3—3 of FIG. 2.
Figure 4:
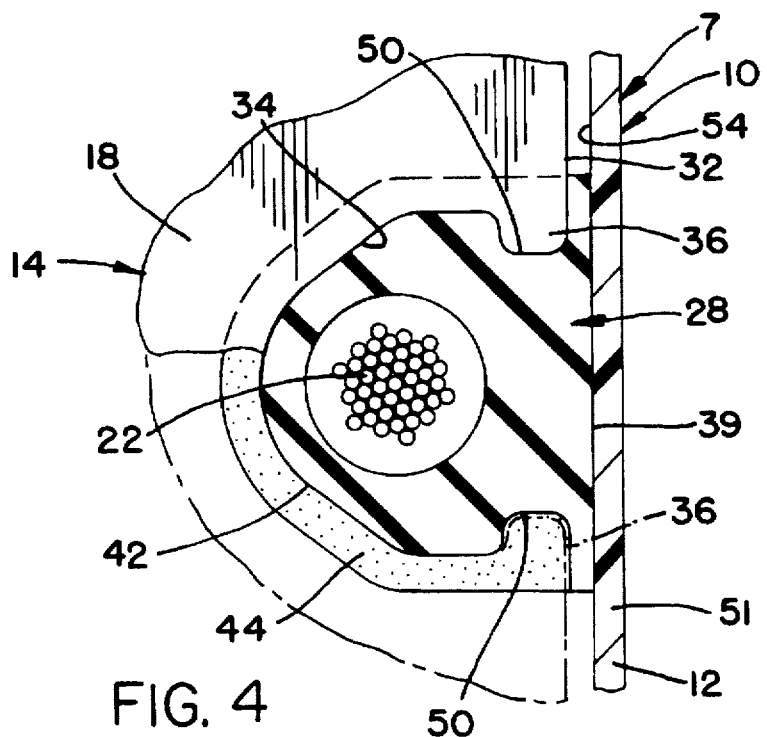
FIG. 4 is a view taken along line 4—4 of FIG. 3.

Referring to FIGS. 1–4, the vehicle door arrangement or combination 7 has a door 10 with an outer panel 12 joined to an inner panel 14. Mounted to the inner panel 14 is an interior trim panel 16. The inner panel 14 is approximately 0.8 to 1.6 mm thick and has a side portion 16 and an inner panel leg 18 which extends along the main axis of the vehicle generally parallel to the outer panel 12. Extending into a cavity 20 formed between the outer panel 12 and the inner panel 14 is a wiring harness 22. The wiring harness connects to various electrical components such as a speaker 24 and an optional auxiliary light 26, as well as other various electrical components within the door 10 (not shown).

The wiring harness is mounted and protected by a grommet 28. The grommet 28 proceeds from the door 10 to an A-pillar 30 to allow the wiring harness 22 to make connection with the rest of the vehicle electrical system.

The inner panel leg 18 has a side edge 32. Intersecting the side edge 32 is a through opening 34. The through opening 34 has two opposed ears 36 extending toward one another. The tubular one-piece grommet 28 is typically fabricated from a resilient elastic material such as ethylene propylene diene monomer (EPDM) rubber. The grommet has a groove 42 which extends inwardly from the outer periphery of the grommet 28 and whose outward facing bottom is shaped substantially complementary to the opening 34 having an interference fit of approximately 0.25 mm. Juxtaposing the groove 42 of the grommet are two flanges 44 and 46.

In vehicle assembly, the wiring harness will be fed through the opening 34. Typically this will occur before the joining of the outer panel 12 to the inner panel 14 (especially when the outer panel 12 is a fiberglass or plastic panel). The grommet 28 and its associated wire harness 22 will therefore be slid into place in a direction generally parallel to the leg 18 of the inner panel. Therefore, the inner flange 46 does not have to be pulled through the opening 34. As the grommet 28 along with its enclosed wiring harness 22 is transversely inserted into opening 34, the ear 36 will engage the bottom of grommet groove 42, deflecting the grommet until the grommet 28 is fully received in the opening 34 and the ear is aligned with a deeper portion 50 of the grommet groove, whereupon the grommet 28 due to its inherent resiliency returns to its free state position and locks behind the ear 36 to lock the grommet 28 to the leg 18 of the interior door panel 14.

A flat surface 39 of the grommet also seals with a bent leg 51 of the outer panel. A piece of sponge tape (not shown) seals the area between the edge 32 of the inner panel and an edge 54 of the outer panel above and below edge 39 of the grommet.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. In combination, a vehicle door having inner and outer panels, said inner panel having a through opening, a tubular grommet which is received in said opening and snap-fittingly secured to said inner panel, and a plurality of electrical conductors extending through said grommet, the improvement being that said through opening in said inner panel extends inwardly from a side edge of said inner panel, said inner panel having at least one ear extending transversely into said opening adjacent said side edge and said grommet is resilient and has a groove which extends inwardly from its outer periphery and whose outwardly facing bottom is shaped substantially complementary to said opening, said ear engaging said bottom of said groove and deflecting said grommet as the latter is transversely inserted into said opening until said grommet is fully received in said opening and said ear is aligned with a deeper portion of said groove whereupon said grommet, due to its inherent resiliency, returns toward its normal free state position and locks behind said ear to lock said grommet to said panel, and wherein said grommet has a plane surface which seals with said outer panel.

2. A vehicle door combination as described in claim 1 wherein said inner panel has two opposed ears extending toward one another.

* * * * *